US005497372A

United States Patent [19]

Nankoh et al.

[11] Patent Number: 5,497,372

[45] Date of Patent: Mar. 5, 1996

[54] FM MULTIPLEX BROADCASTING AND RECEIVING SYSTEM

[75] Inventors: Mitsuo Nankoh, Osaka; Akio Inoue, Nara; Hitoshi Yokomizo, Hyougo; Yosikazu Tomida; Tohru Kawabata, both of Osaka, all of Japan

[73] Assignee: Sanyo Electric Co., Ltd., Osaka, Japan

[21] Appl. No.: 207,558

[22] Filed: Mar. 8, 1994

[30] Foreign Application Priority Data

Mar. 11, 1993 [JP] Japan .................................... 5-050673

[51] Int. Cl.$^6$ .................................................. H04J 1/14

[52] U.S. Cl. .................. 370/69.1; 455/154.1; 455/158.4; 455/186.1

[58] Field of Search .............................. 370/69.1, 71, 73, 370/18; 455/154.1, 156.1, 158.1, 186.1, 186.2, 3.1, 45, 185.1, 158.2, 158.4, 161.1, 46; 381/77, 2, 78

[56] References Cited

U.S. PATENT DOCUMENTS

| | | | |
|---|---|---|---|
| 4,379,941 | 4/1983 | Warner | 370/69.1 |
| 4,499,601 | 2/1985 | Matthews | 455/186.1 |
| 4,887,308 | 12/1989 | Dutton | 455/186.1 |
| 5,063,610 | 11/1991 | Alwadish | 455/45 |
| 5,119,507 | 6/1992 | Mankovitz | 455/186.1 |
| 5,134,719 | 7/1992 | Mankovitz | 455/154.1 |
| 5,214,792 | 5/1993 | Alwadish | 455/45 |
| 5,278,826 | 1/1994 | Murphy et al. | 370/69.1 |

*Primary Examiner*—Douglas W. Olms
*Assistant Examiner*—Chau T. Nguyen
*Attorney, Agent, or Firm*—Loeb and Loeb

[57] ABSTRACT

An FM multiplex broadcasting and receiving system has an FM multiplex broadcast apparatus and an FM multiplex receiving apparatus. The FM multiplex broadcast apparatus has a reproducing device for reproducing, from a recording medium, an audio signal and character data associated with the audio signal recorded in the recording medium. The FM multiplex broadcast apparatus also includes a multiplex device and a frequency modulation device. The multiplex device multiplexes the audio signal with additional information such as the character data to generate a multiplex signal. The frequency modulation device frequency modulates a carrier with the multiplex signal to provide an FM multiplex broadcasting signal. The FM multiplexing receiving apparatus has a frequency demodulating device for frequency demodulating the FM multiplex broadcast signal to provide an audio signal and an additional information data signal, a displaying device displaying the additional information data signal.

10 Claims, 4 Drawing Sheets

FM MULTIPLEX BROADCASTING AND RECEIVING SYSTEM

FIELD OF THE INVENTION

The present invention relates to an FM multiplex broadcasting and receiving system. More particularly the present invention relates to an FM multiplex broadcasting apparatus in which an audio signal and additional information are multiplexed and broadcasted. Further, the present invention relates to an FM multiplex receiver which receives the FM multiplex broadcasting signal and uses the additional information.

BACKGROUND OF THE INVENTION

An FM multiplex broadcasting system is a broadcasting system in which an audio signal and additional information are multiplexed and broadcasted. The additional information may preferably include, for example, a broadcasting station's name and time data. Depending on the additional information, a listener of the FM multiplex broadcast may use the additional information.

A variety of FM multiplex broadcasting systems have been developed in the United States, Europe and Japan. For example, such systems include Subsidiary Communication Authorization (SCA) in the U.S. and Radio Data System (RDS) in Europe.

The RDS system uses, for example, a program service name (PS) which identifies the names of broadcasting stations, a music/speech switch (M/S) which identifies whether a broadcast program is music or speech and a clock time (CT), as the additional information.

Further, it is preferable to broadcast an audio signal of, for example, a music piece, with character data associated with the music piece. The character data may include, for example, the name of the music piece, the title of an album which includes the music piece and the names of artists who play the music.

As a result, a listener of the program can visually confirm the character data displayed on the display of a receiver. For example, a listener can confirm the name of the music piece, the title of an album which includes the music and the names of the artists who play the music.

However, it is necessary to prepare the character data and to associate the character data with the audio signal, before the audio signal and the character data associated with the audio signal are broadcast. In other words, it is necessary to make a database of character data. It is expensive to make and to maintain such a database.

SUMMARY OF THE INVENTION

An object of embodiments of the present invention is to provide an FM multiplex broadcasting and receiving system which provides a main program with additional information at a lower cost.

These and other objects of the present invention are achieved by an FM multiplex broadcasting and receiving system having an FM multiplex broadcasting apparatus and a FM multiplex receiving apparatus in which the FM multiplex broadcasting apparatus broadcasts an FM multiplex broadcast signal composed of a carrier signal frequency modulated by an audio signal and by additional information data. The FM multiplex receiving apparatus receives the FM multiplex broadcast signal.

The FM multiplex broadcasting apparatus comprises a reproducing device for reproducing an audio signal and a character data associated with the audio signal from a recording medium. The FM multiplex broadcasting apparatus also has a multiplex device for multiplexing the audio signal with the additional information data, such as the character data, to make a multiplex signal, and a frequency modulation device for frequency modulating a carrier signal with the multiplex signal to provide a FM multiplex broadcast signal.

The FM multiplexing receiving apparatus comprises a frequency demodulator for frequency demodulating the FM multiplex broadcasting signal to provide an audio signal and an additional information data signal. The FM multiplex receiving apparatus further comprises a displaying device for displaying the additional information data signal.

According to the FM multiplex broadcasting and receiving system, the character data from the reproducing device is multiplexed with the audio signal for broadcasting. If the reproducing device uses the medium which contains the character data associated with a music piece, it is not necessary for a broadcasting station to prepare the character data associated with the music piece. The broadcasting station can use the character data recorded with the music on the recording medium of the reproducing device. As a result, there is no need (and no cost) for preparing the character data.

DETAILED DESCRIPTION OF THE PREFERRED EMBODIMENTS

An FM multiplex broadcasting and receiving system in accordance with an embodiment of the present invention will be described below in detail with reference to the drawings.

Figure 1:
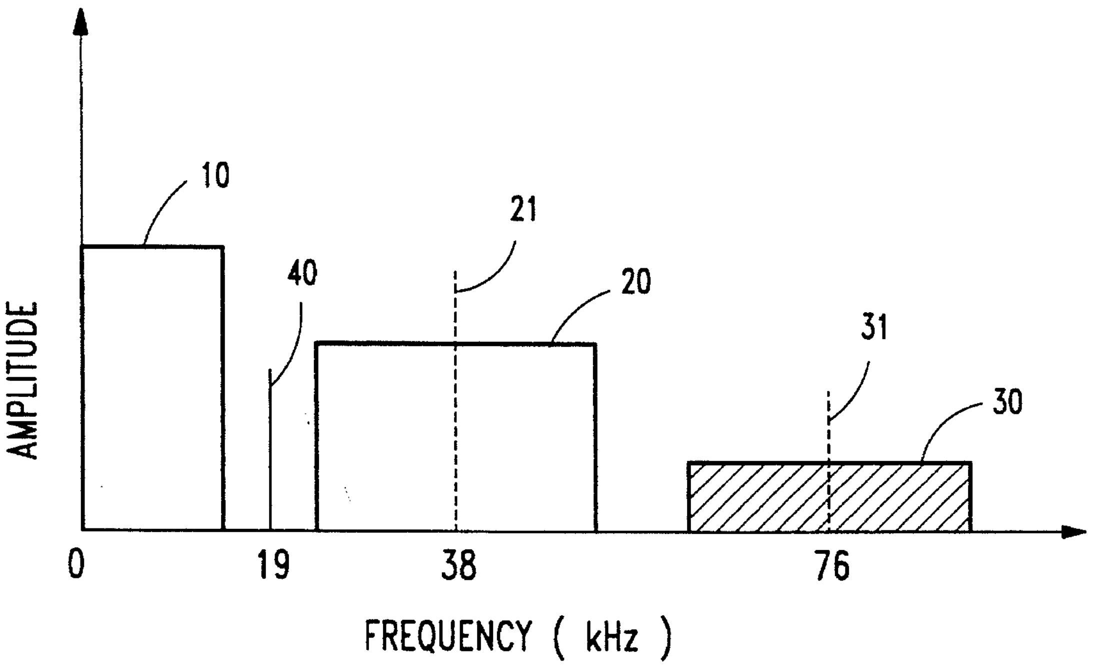
FIG. 1 is an explanatory view showing a frequency diagram of FM multiplex broadcasting.

FIG. 1 shows a frequency spectrum diagram of the FM multiplex broadcasting. An audio signal in stereophonic broadcasting has a right (R) signal and a left (L) signal. An ordinary FM broadcast uses an summation signal of the L signal and the R signal (L+R) 10 and a difference signal of the L signal and the R signal (L–R) 20 which modulates a first sub-carrier 21 (designated by the doted line) in suppressed-carrier amplitude modulation. The first sub-carrier 21 illustratively has a frequency of 38 KHz.

An FM multiplex broadcast uses a data signal 30 which modulates a second sub-carrier 31 (designated by the doted line). The second sub-carrier 31 illustratively has a frequency of 76 KHz. The data signal is a digital signal modulated by an additional information data signal.

A pilot signal 40 which designates a stereophonic broadcast mode illustratively has a frequency of 19 KHz. Further, a combination of these signals 10, 20, 30 and 40 modulates a carrier signal (not shown in FIG. 1) in frequency i.e., frequency modulation.

Figure 2:
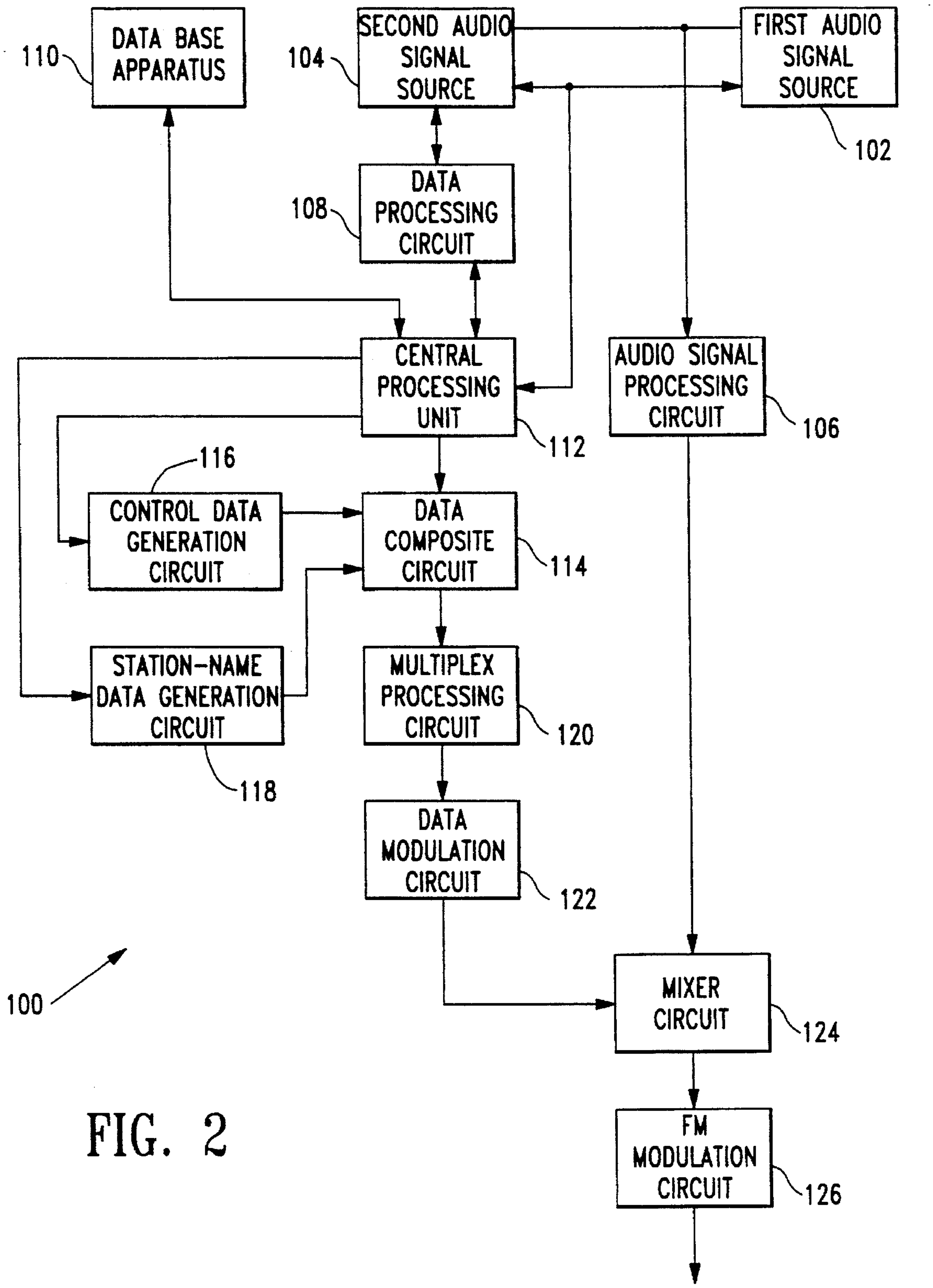
FIG. 2 is a block diagram showing a broadcasting apparatus in accordance with one embodiment of the present invention.

First, an FM multiplex broadcasting apparatus used in a broadcasting station is described with reference to FIG. 2. In one embodiment of the present invention, an FM multiplex broadcasting apparatus 100 has a first audio signal source 102 including a recording medium in which an audio signal is recorded. The first audio signal source 102 provides a reproducing audio signal as an output signal reproduced from the recording medium. The first audio signal source includes, for example, a CD player or an analog audio tape recorder.

A second audio signal source 104 has a recording medium in which an audio signal and character data associated with the audio signal are recorded. The second audio signal source 104 provides the audio signal and the character data as output signals. The character data includes, for example, the title of a music piece, the title of the album which includes the music and the name of the artists who plays the music. The second audio signal source 104 may includes audio equipment such as, for example, a digital compact cassette (DCC), a mini disc (MD) and a digital audio tape recorder (DAT). Recording mediums in this equipment includes data areas in addition to an audio signal area. The data areas may contain a character data which includes, for example, the name of each music piece, the name of an artist and lyrics.

An audio signal processing circuit 106 receives audio signals from the first audio signal source 102 and the second audio signal source 104. The audio signal processing circuit 106 provides the (L+R) signal 10(FIG. 1). Further, the audio signal processing circuit 106 provides the first sub-carrier signal 21 modulated by the (L–R) signal 20, if the audio signal from the first or the second audio signal source 102, 104 is a stereophonic signal. In addition to these signal, the audio signal processing circuit 106 provides the pilot signal 40 in the stereophonic mode.

A data processing circuit 108 receives the character data in the output signal from the second audio signal source 104. The data processing circuit 108 makes a data format conversion from the data format of the second audio signal source 102 to a data format for FM multiplex broadcasting.

A database apparatus 110 has character data such as, for example, the name of a music piece, the names of artists who play the music, the lyrics of the music and information about concerts by the artists. Output data from the database apparatus 110 has the same data format as the data format for FM multiplex broadcasting. The character data in the database apparatus 110 may be made by the broadcasting station itself or purchased from a data distributer.

The broadcasting station may use the data of the database apparatus 110 with the audio signal of the first audio signal source 102. In other words, when the first audio signal source 102 provides a music selection, character data associated with the music selection is optionally retrieved from the database apparatus 110 by an operator in the broadcasting station.

A central processing unit (CPU) 112 controls the operation of the FM broadcasting apparatus. Further, the CPU 112 controls the operation of the first audio signal source 102 and the second audio signal source 104. The CPU 112 receives character data from the data processing circuit 108 and the database apparatus 110. The CPU 112 selects one of the character data from the data processing circuit 108 or the database apparatus 110 and provides the selected character data to a data composite circuit 114. The CPU 112 also controls a control data generation circuit 116 and a station-name data generation circuit 118.

The control data generation circuit 116 generates control data which controls an FM multiplex broadcast receiving apparatus described hereinafter. The station-name data generation circuit 118 generates the name of a broadcasting station which is using the FM multiplex broadcasting apparatus 100.

The data composite circuit 114 receives the character data, the control data and the station-name data. The data composite circuit 114 composes these data and makes an additional information data signal. Further, it is preferable that the data composite circuit 114 optionally receives program data which designates a program name and/or a program type (not shown in FIG. 2).

A multiplex processing circuit 120 receives the additional information data signal from the data composite circuit 114. The multiplex processing circuit 120 makes a formatted data signal from the additional information data signal. The formatted data has a format suitable for multiplexing with the audio signal. The formatted data from the multiplex processing circuit 120 is provided to a data modulation circuit 122.

The data modulation circuit 122 performs an L-MSK (Level controlled minimum shift keying) data modulation according to the formatted data modulation and provides a digitally modulated signal to a mixer circuit 124. The L-MSK data modulation is a data modulation in which the level of a data carrier signal, which is MSK modulated by the formatted data, is controlled by the level of the audio signal.

The mixer circuit 124 also receives the (L+R) signal, the first sub-carrier signal modulated by the (L–R) signal and the pilot signal from the audio processing circuit 106. Therefore, the mixer circuit 124 provides a mixed signal which comprises the (L+R) signal, the first sub-carrier signal modulated by the (L–R) signal, the pilot signal and the digital modulated signal. An FM modulation circuit 126 receives the mixed signal from the mixer circuit 124. A predetermined frequency of the carrier signal is modulated by the mixed signal in the FM modulation circuit 126 and broadcast.

The control data controls, for example, the operation of recording and reproducing apparatus at the receiving apparatus. For example, a specific flag byte of the control data becomes "1" when a music piece is on the air. Therefore, it is possible that the recording operation of the recording and reproducing apparatus associated with the receiving apparatus is carried out only when the specific flag byte of the control data is active, for example, at "1". As a result, the recording and reproducing apparatus may record only the music part of the broadcast(an automatic recording operation).

Further, if the control data is recorded with the audio signal, the recording and reproducing apparatus at the receiving apparatus can use the control data as a cue signal to detect the start portion of a music piece. For example, this is preferably achieved by detecting a transition from "0" to "1" of the specific byte of the control signal in a high speed reproduction mode of the recording and reproducing apparatus (a cue signal detecting operation).

Another control data may have both a starting flag and an ending flag. The starting flag and the ending flag represent, respectively, the start and end of the music piece. The recording and reproducing apparatus associated with the receiving apparatus can start the recording operation by detecting the starting flag being active, for example, at "1". The recording and reproducing apparatus can end the recording operation by detecting the end flag being active. The automatic recording operation and the cue signal detecting operation will be described in greater detail below in conjunction with the FM multiplex broadcasting receiver.

An operation of the broadcasting apparatus of the present invention will now be described. First, described is a case in which the CPU 112 directs the second audio signal source 104 to provide a reproducing signal. As described above, the second audio signal source 104 has a recording medium which includes an audio signal and character data associated with the audio signal. The audio processing circuit 106 receives the reproducing signal from the second audio signal source 104. The audio processing circuit 106 performs stereophonic matrix processing of the reproducing signal provided from the second audio signal source 104. The mixer circuit 124 receives an output signal provided from the audio processing circuit 106.

The second audio signal source also reproduces and provides character data associated with the reproducing signal. The data processing circuit 108 receives the character data and converts them to a predetermined data format that is the same as the data format of the data base apparatus 110. The CPU 112 selects and receives the output data signal from the data processing circuit 108. The CPU 112 further provides the character data, which is provided by the data processing circuit 108, to the data composite circuit 114.

The control data generation circuit 116 provides the control data under the direction of the CPU 112. The station-name data generation circuit 118 also provides the station-name data under the direction of the CPU 112. The data composite circuit 114 receives the control and station-name data. The data composite circuit 114 also receives the character data from the CPU 112. The data composite circuit 114 composes these data and provides the additional information data signal. It is preferable that the additional information data signal includes program name data.

The multiplex processing circuit 120 receives the additional information data signal and provides the formatted data to the data modulation circuit 122. The data modulation circuit 122 provides the data signal modulated by the formatted data using L-MSK data modulation. The modulated data signal is mixed with the (L+R) signal, the first sub-carrier signal modulated by the (L−R) signal and the pilot signal in a mixer circuit 124. A mixed composite signal modulates the carrier signal in the FM modulation circuit 126.

When the first audio signal source 102 is selected by the CPU 112, the first audio signal source 102 provides a reproducing signal. The CPU 112 controls the database apparatus 110 and retrieves the character data associated with the reproducing signal provided by the first audio signal source 102. The character data associated with the reproducing signal is combined with the control data and the station-name data in the data composite circuit 114. In the following signal processing, the data is processed in a similar manner as the case in which the second audio signal source 104 is selected by the CPU 112.

Further, when the first audio signal source 102 is selected by the CPU 112, the character data associated with the reproduction audio signal may be recorded by a recording apparatus such as, for example, a DCC with a reproduction audio signal provided by the first audio signal source 102. Since both the character data and the reproduction audio signal from the first audio signal source 102 are recorded in the DCC, it is preferable to use a reproduction signal and character data from the DCC instead of from the first audio signal source 102 and the database apparatus 110.

Figure 3:
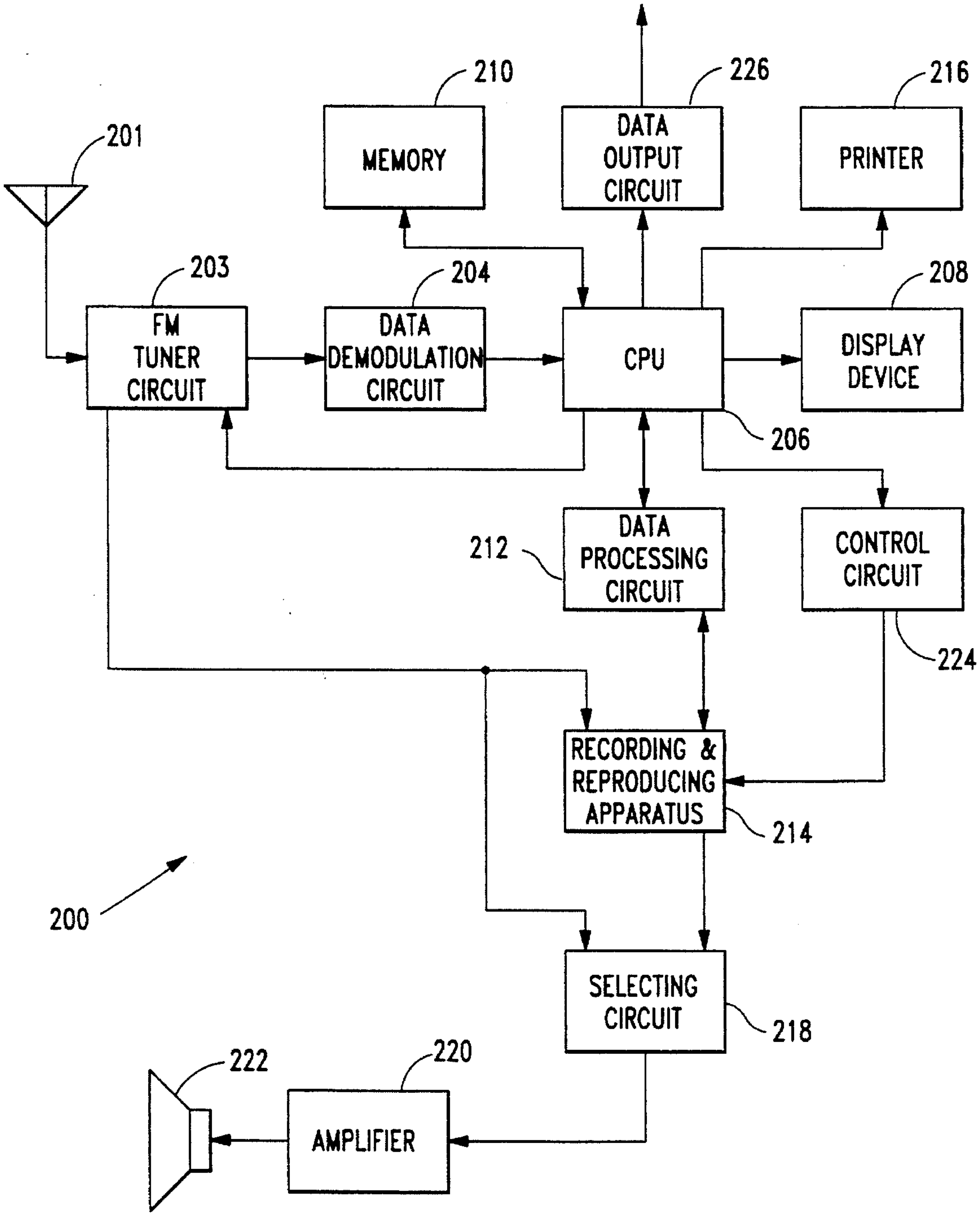
FIG. 3 is a block diagram of a receiving apparatus in accordance with one embodiment of the present invention.

An FM multiplex receiver in accordance with one embodiment of the present invention will now be described. FIG. 3 shows a block diagram of an FM multiplex receiver 200. An FM tuner circuit 203 receives a high frequency signal from an antenna 201. The tuner circuit 203 has a tuning function which selects one broadcast station. The tuner circuit 203 further has an FM demodulating function and an audio signal processing function. The FM demodulating function is to demodulate the selected carrier signal in frequency. The audio signal processing function is to provide a stereo-phonic demodulated audio signal. The tuner circuit 203 further has a scanning function.

A data demodulation circuit 204 receives the signal from the FM tuner circuit 203. The data demodulator circuit 204 L-MSK demodulates the FM demodulating signal. Further, the data demodulator circuit 204 provides the additional information data signal to a CPU 206. The CPU 206 controls functions of the FM multiplex receiver 200 such as, for example, providing a scanning instruction to the FM tuner 203 and providing the character data of the additional information data signal to a display device 208 for displaying the character data. The display device 208 is, for example, a liquid crystal display.

A memory 210 temporally memorizes the additional information data signal from the CPU 206. A data process circuit 212 receives the additional information data signal from the CPU 206. The data process circuit 212 extract the character data from the additional information data signal from the CPU 206. The data process circuit 212 changes the data format of the character data into a format suitable for a recording and reproducing apparatus 214.

The recording and reproducing apparatus 214 such as, for example, a DCC, DAT or MD records an audio signal from the FM tuner 203 and formatted character data from the data processing circuit 212. When the DCC 214 is in the reproducing mode, the data processing circuit 212 also receives reproduced character data from the DCC 214 and makes a format conversion for displaying at a display 208 device or for printing at a printer 216.

The CPU 206 also directs a scanning and displaying function which displays broadcast station's names and program names on the display device 208. The broadcast station's names and the program names are derived from the scanning operation of the tuner 203 when the FM multiplex receiver 200 is turned on.

A selecting circuit 218 selects an audio signal from the FM tuner 203 or from the recording and reproducing device 214. A selected audio signal from the select circuit 218 is amplified at an amplifier 220 and outputted from a speaker 222.

A DCC control circuit 224 controls operation of the DCC 214 such as, for example, an automatic recording operation, or an automatic detection operation for detecting the starting portion of a music piece and reproducing the music piece. The DCC control circuit 224 controls the DCC 214 according to control data which includes the additional information data.

A data output circuit 226 receives the character data from the CPU 206 and may provide the character data to, for example, an external personal computer or an external printer. As described above, the FM multiplex receiver in accordance with one embodiment of the invention has the DCC 214 and the printer 216.

The FM multiplex receiver 200 further has the functions listed below.

1. A displaying function of displaying character data from the FM multiplex broadcasting or from a recording and reproducing apparatus such as, for example, DCC.

2. A displaying function of displaying names of receivable broadcast stations and the names of programs in the form of a list.

3. An automatic recording function and an cue signal detecting function.

4. A printing function of printing the character data.

The functions of the FM multiplex receiver 200 are described in the under listed above.

1. A displaying function of displaying character data provided from the FM multiplex broadcasting or from a recording and reproducing apparatus such as, for example, DCC.

Figure 4:
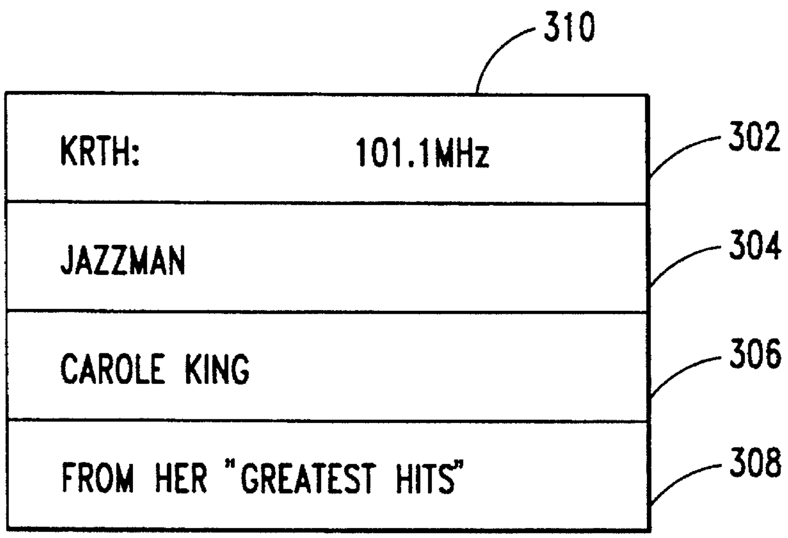
FIG. 4 is an explanatory view of a display device (of one embodiment of the present invention) displaying additional information.

In receiving mode of the FM multiplex broadcasting, the CPU 206 provides the character data and station name data to the display device 208. The character data and station name data are included in the additional information data signal from the data demodulator circuit 204. For example, as shown in FIG. 4, the name and broadcast frequency of an FM broadcast station 302, the name of a music piece 304, the name(s) of the artist(s) 306 and other information 308 about the music piece are displayed on a display screen 310.

Next, as the CPU 206 selects the character data from the data processing circuit 212 and provides it to the display device 208 in a reproduction mode of the DCC 214, the display device 208 displays the character data of the reproducing signal from the DCC 214. Such displayed information is similar to the one shown in FIG. 4. But instead of the name of the broadcasting station, the name of reproduction apparatus such as, for example, "DCC reproduction" is displayed on the display screen 310. Users can distinguish the source of the audio signal from the display device 208.

Further, there are two methods for displaying the character data from a recording medium of the DCC 214. The first method is displaying the character data synchronously with the associated reproducing audio signal. In other words, the characters displayed on the display device 208 are changed as the music changes. The second method is extracting only the character data from the DCC 214 at high speed and displaying the character data independently of the music(audio signal) being played. The second method is convenient for users who wish to know the content of the recording medium in the DCC 214.

In the first method, it is preferable to display the character data for a predetermined period of time at the start portion of each music piece. After that predetermined time period, other information such as, for example, the lyrics of the music piece may be displayed.

2. A displaying function of displaying names of receivable broadcast stations and the names of programs in list form.

When the FM multiplex receiver 200 is turned on, the CPU 206 provides a scanning instruction to the FM tuner 203. The scanning instruction directs the FM tuner 203 to carry out a scanning operation. The FM tuner 203 starts the scanning operation which searches receivable broadcast stations in a predetermined frequency area and memorizes the frequency of the receivable stations. Further, the CPU 206 extracts the name of the receivable station and the name of the program available on such station and stores these names in the memory 210.

Figure 5:
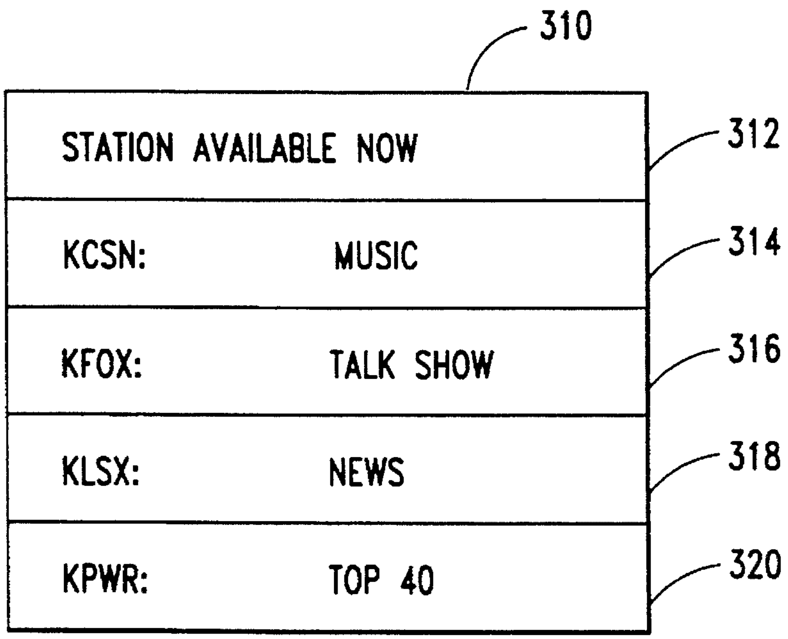
FIG. 5 is an explanatory view of a display device of the present invention displaying additional information.

After finishing the scanning operation of the FM tuner 203, the CPU 206 retrieves name data from the memory 210 and provide them to the display device 208. The display shows broadcast station names and its program name, as shown in FIG. 5. For example, there are 4 FM broadcasting station names and their program names 314, 316, 318 and 320 displayed on the screen 310. Therefore, as receivable broadcast stations are displayed in the form of a list, users may selects their favorite stations. Further, it is preferable that the list as shown in FIG. 5 may be printed by the printer 216.

3. An automatic recording function and a cue signal detecting function.

The CPU 206 extracts the control data from an output of the data demodulation circuit 204 and provides the control data to the DCC control circuit 224. The DCC control circuit 224 controls the operation of the DCC 214. For example, if the specific flag of the control data is active, for example, at "1", the DCC 214 goes into a recording mode. If the specific flag of the control data is non-active, for example, at "0", the DCC 214 goes into a pause mode or a stop mode. As the specific flag of the control data is active only if a music piece is on the air, the DCC 214 records only music.

It is preferable that the control data is recorded with the audio signal. Further, when the specific flag of the control data changes from "1" to "0", it is preferable not to immediately stop the recording operation of the DCC 214, but to continue the recording operation without the recording audio signal for a predetermined period. As a result, in the predetermined period, the control data having its specific flag being "0" is recorded. In other words, the specific flag of the control data recorded with the audio signal becomes "0" (non-active) between one music piece and the next music piece. In the reproducing mode, to find the start portion of the music, it is preferable to search a transition portion between the specific flag of a reproduced control data being "0" and the specific flag being "1". As a portion between one music piece and the next has the specific flag of the reproduced control data being "0", by detecting the transition portion of the specific flag of the reproduced control data from "0" to "1", the start portion of the music recorded on the tape of DCC 212 can be found.

If the control data of the broadcasting signal has the starting flag and the ending flag, an automatic recording operation of a music may be achieved by finding the starting flag of the control data from the broadcasting signal and then beginning the recording operation of the DCC 212. In this case, the starting flag of the control data is preferably recorded with the audio signal of the broadcasting signal. In the reproducing mode of the DCC 212, it is preferable to find the starting portion of the music piece by detecting the starting flag being active.

4. A printing function printing of the character data.

While the CPU 212 provides the character data to the display device 208, the CPU 212 preferably provides the character data to the printer 216 in the receiving mode. As a result, the printer may print the character data. The user of the receiving apparatus 200 can use the printed character data such as, for example, the name of the music piece, the name of the artist who play the music and other information about the music piece. Further, it is preferable to print lyrics of the music piece for karaoke. And it is also preferable to print the character data from the DCC 212 in the reproduction mode of the DCC 212. When the display device 208 is not able to display many characters, it is noted that the user can obtain more information from the print out provided by the printer 216.

What is claimed is:

1. An FM multiplex broadcasting apparatus wherein a carrier signal being frequency modulated by a first audio signal and an additional information data is broadcast, the FM multiplex broadcasting apparatus comprising:

first reproducing means for reproducing, from a recording medium, the first audio signal and a character data associated with the first audio signal as the additional information data;

multiplex means for frequency multiplexing the first audio signal and the additional information data to provide a multiplex signal;

frequency modulation means for frequency modulating the carrier signal with the multiplex signal;

second reproducing means for reproducing a second audio signal;

database means for storing and retrieving second character data associated with the second audio signal;

data modulation means for providing the additional information data to the multiplex means;

first selecting means for selecting and providing to the data modulation means one of the second character data from the database means and the character data from the first reproducing means;

second selecting means for selecting and providing to the multiplex means one of the second audio signal from the second reproducing means and the first audio signal from the first reproducing means; and control data providing means for providing a control data to the data modulation means, the control data designating a starting portion of a selected program, the multiplex means further multiplexing the control data with the first audio signal to provide the multiplex signal, the first selecting means selecting the second character data from the database means when the second selecting means selects the second audio signal from the second reproducing means, and selecting the character data from the first reproducing means when the second selecting means selects the first audio signal from the first reproducing means.

2. An FM multiplex broadcasting apparatus as recited in claim 1, wherein the selected program comprises a music piece.

3. An FM multiplex broadcasting apparatus as recited in claim 1 further comprising name data generating means for providing a broadcast station name data to the multiplex means.

4. An FM multiplex receiving apparatus for receiving an FM multiplex broadcast signal, the FM multiplex broadcast signal including an audio signal and a first additional information data signal multiplexed with the audio signal, the FM multiplex receiving apparatus comprising:

control means for controlling the FM multiplex receiving apparatus;

tuning means for receiving the FM multiplex broadcast signal and scanning for available broadcast stations according to a scanning order provided by the control frequency demodulating means for frequency demodulating the FM multiplex broadcast signal, the frequency demodulating means separating and providing the audio signal and the first additional information data signal, the first additional information data signal including broadcast station name data;

displaying means for displaying the first additional information data signal;

reproducing means for reproducing, from a recording medium of the FM multiplex receiving apparatus, a second additional information data signal contained in the recording medium;

display selecting means for selecting one of the first additional information data signal from the frequency demodulating means and the second additional information data signal from the reproducing means and providing one of the first additional information data signal and the second additional information data signal to the displaying means; and memory means for storing the broadcast stations name data tuned during scanning, the control means controlling the display means to display the broadcast station name data stored in the memory means.

5. An FM multiplex receiving apparatus defined in claim 4, wherein the scanning order is provided from the control means when the FM multiplex receiving apparatus is turned on.

6. An FM multiplex receiving apparatus as recited in claim 4, wherein the recording means records the audio signal when the control data is at a first state and does not record the audio signal when the control data is at a second state.

7. An FM multiplex broadcasting apparatus as recited in claim 6, wherein the selected program comprises a music piece.

8. An FM multiplex receiving apparatus for receiving an FM multiplex broadcast signal, the FM multiplex broadcast signal including an audio signal and a first additional information data signal multiplexed with the audio signal, the FM multiplex receiving apparatus comprising;

frequency demodulating means for frequency demodulating the FM multiplex broadcast signal, the frequency demodulating means separating and providing the audio signal and the first additional information data signal, the first additional information data signal including a control data that designates a start portion of a selected program;

displaying means for displaying the first additional information data signal;

reproducing means for reproducing, from a recording medium of the FM multiplex receiving apparatus, the second additional information data signal contained in the recording medium; and displaying selecting means for selecting and providing to the displaying means one of the first additional information data signal from the frequency demodulating means and the second additional information data signal from the reproducing means;

recording means for recording the audio signal from the frequency demodulating means;

control data extracting means for the extracting control data from the first additional information data signal; and control means for controlling the recording means in accordance with the control data.

9. A FM multiplex broadcasting receiver as defined in claim 8, wherein the recording means records the control data with the audio signal.

10. An FM multiplex broadcasting apparatus wherein a carrier signal being frequency modulated by a first audio signal and an additional information data is broadcast, the FM multiplex broadcasting apparatus comprising:

first reproducing means for reproducing, from a recording medium, the first audio signal and a character data associated with the first audio signal as the additional information data;

multiplex means for multiplexing the first audio signal and the additional information data to provide a multiplex signal;

frequency modulation means for frequency modulating the carrier signal with the multiplex signal;

second reproducing means for reproducing a second audio signal;

database means for storing and retrieving second character data associated with the second audio signal;

control means for controlling the first reproducing means and the second reproducing means and selecting one of the second audio signal from the second reproducing means and the first audio signal from the first reproducing means, the control means further selecting one of the second character data from the database means and the character data from the first reproducing means;

control data providing means for providing a control data designating a starting portion of a selected program in accordance with the control means;

wherein the multiplex means multiplexes the control data from the control data providing means with the first audio signal and the character data, and the control means selects the second character data from the database means when the control means selects the second audio signal from the second reproducing means, and selecting the character data from the first reproducing means when the control means selects the first audio signal from the first reproducing means.

* * * * *